US008070436B2

(12) United States Patent
Mitchell

(10) Patent No.: US 8,070,436 B2

(45) Date of Patent: Dec. 6, 2011

(54) COOLING AIRFLOW MODULATION

(75) Inventor: Mark Timothy Mitchell, Bristol (GB)

(73) Assignee: Rolls-Royce PLC, London (GB)

( * ) Notice: Subject to any disclaimer, the term of this patent is extended or adjusted under 35 U.S.C. 154(b) by 580 days.

(21) Appl. No.: 12/318,624

(22) Filed: Jan. 2, 2009

(65) Prior Publication Data

US 2009/0196737 A1 Aug. 6, 2009

(30) Foreign Application Priority Data

Feb. 4, 2008 (GB) .................................. 0801904.4

(51) Int. Cl.

| | |
|---|---|
| ***B64C 11/00*** | (2006.01) |
| ***B64C 27/00*** | (2006.01) |
| ***B63H 1/14*** | (2006.01) |
| ***B63H 7/02*** | (2006.01) |
| ***F01D 5/08*** | (2006.01) |
| ***F01D 5/18*** | (2006.01) |
| ***F01D 5/14*** | (2006.01) |
| ***F01D 5/28*** | (2006.01) |
| ***F03D 11/02*** | (2006.01) |
| ***F04D 29/58*** | (2006.01) |
| ***F03B 11/00*** | (2006.01) |

(52) U.S. Cl. ........... 416/1; 416/95; 416/96 R; 416/96 A; 416/97 R; 416/97 A; 415/115

(58) Field of Classification Search ................ 416/1, 95, 416/96 R, 96 A, 97 R, 97 A; 415/115
See application file for complete search history.

(56) References Cited

U.S. PATENT DOCUMENTS 4,805,398 A 2/1989 Jourdain et al.

FOREIGN PATENT DOCUMENTS

| | | |
|---|---|---|
| GB | 1 491 112 | 11/1977 |
| GB | 2 236 147 A | 3/1991 |
| GB | 2 390 663 A | 1/2004 |
| JP | A-02-021173 | 1/1990 |
| WO | WO 99/30010 A1 | 6/1999 |

*Primary Examiner* — David Zarneke
(74) *Attorney, Agent, or Firm* — Oliff & Berridge, PLC

(57) ABSTRACT

A gas turbine engine airfoil (22) has a wall (42) provided with a cooling effusion hole (40) therein to facilitate film cooling of the external surface (52) of the wall (42). A member (46) attached to the internal surface (48) of the airfoil wall (42) is provided with an aperture (44) which at least partially overlaps the cooling effusion hole (40). The airfoil wall (42) and member (46) are formed from materials having different coefficients of thermal expansion and are mounted such that over a temperature range, the aperture (44) and cooling effusion hole (40) interact to a greater or lesser extent to modulate the flow of cooling air therethrough.

6 Claims, 2 Drawing Sheets

COOLING AIRFLOW MODULATION

Figure 1:
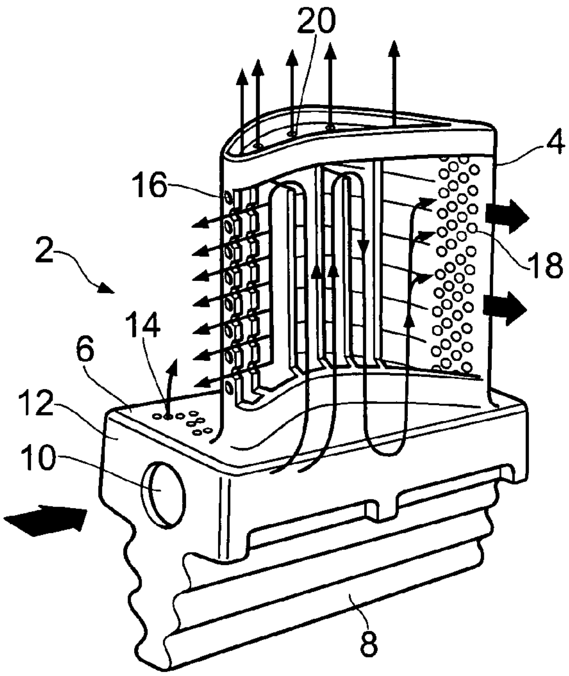

The present invention relates to a gas turbine engine airfoil cooling airflow modulation arrangement and method. In particular the invention concerns an arrangement for controlling cooling airflow for film cooling of a gas turbine engine airfoil.

The operating temperature of a gas turbine engine is closely related to its power output. Thus the higher the power output the higher is the operating temperature. In order to increase the maximum power output level of an engine certain critical components are actively cooled to increase their sustainable operating temperature by cooling air bled from the compressor output. Several mutually conflicting factors affect the design and manner of operation of such air-cooling systems. Higher engine power outputs require higher turbine operating temperatures, which in turn increase the amount of cooling airflow required to cool and maintain the integrity of critical components, such as early stage turbine vanes and blades, but an increased cooling airflow bleed from the compressor represents a reduction in engine operating efficiency. However, the cooling airflow is only necessary in higher operating temperature ranges and is not normally required, or less is required, during cruise and idle phases of operation where an engine spends most of its operational time. The additional hardware required by known airflow valve arrangements and control systems that seek to shut off, or at least restrict or modulate, the compressor air bleed when cooling airflow is not essential introduce unwelcome weight penalties. Known airflow modulation arrangements therefore achieve a power saving at the cost of a weight penalty.

The present invention aims to provide cooling air modulation for film cooling of an airfoil with a reduction of additional hardware and thus with a lower weight penalty than hitherto achieved. The present invention has for one objective to provide a lower rate of cooling airflow during lower operating periods and a higher rate during periods of higher operating temperatures. Another objective is to utilise the operating temperature of the cooled airfoil to operationally vary the amount of cooling airflow.

According to one aspect of the present invention a method of modulating a cooling airflow through a film cooling effusion hole formed in a wall of a gas turbine engine airfoil to provide external surface film cooling of said wall includes the steps of arranging the airflow to pass through a pair of metering apertures, the first of which is constituted by said film cooling effusion hole in said airfoil wall and the second of which is formed in a member mounted relative to said airfoil member wall so that said metering apertures at least partially overlap, the airfoil wall and the member being manufactured from materials having different coefficients of thermal expansion such that over a range of operating temperatures the metering apertures overlap to a greater or lesser extent to modulate the flow of air therethrough.

According to a further aspect of the present invention there is provided a gas turbine engine airfoil having a wall with a metering aperture therein to constitute a film cooling effusion hole for the flow of air therethrough to provide external surface film cooling of said wall, said airfoil additionally being provided with a member having a metering aperture therein which member is mounted relative to said airfoil member wall so that said metering apertures at least partially overlap, the airfoil wall and the member being manufactured from materials having different coefficients of thermal expansion so that over a range of operating temperatures, the metering apertures overlap to a greater or lesser extent to modulate the flow of air therethrough.

Figure 2:
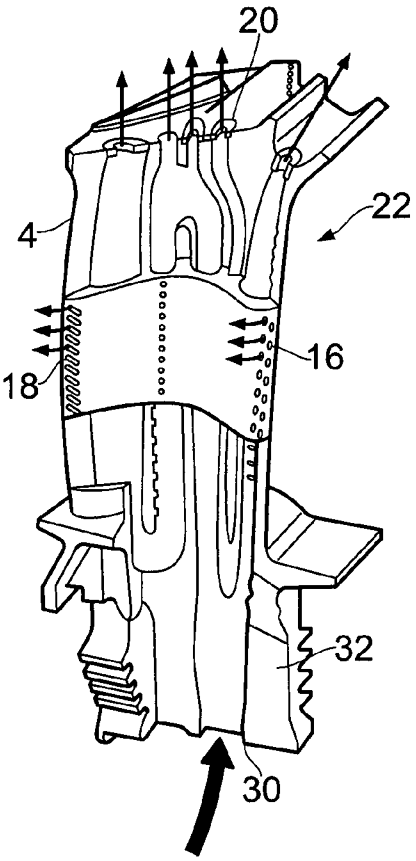
Figure 3A:
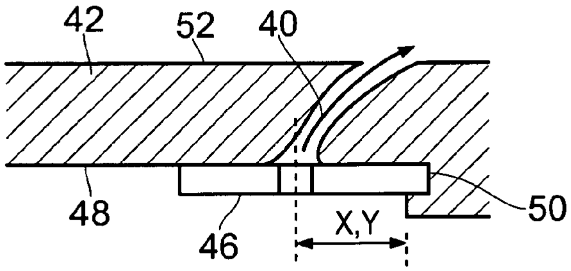
Figure 3B:
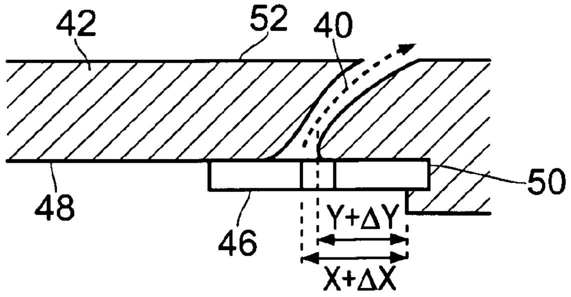
Figure 4A:
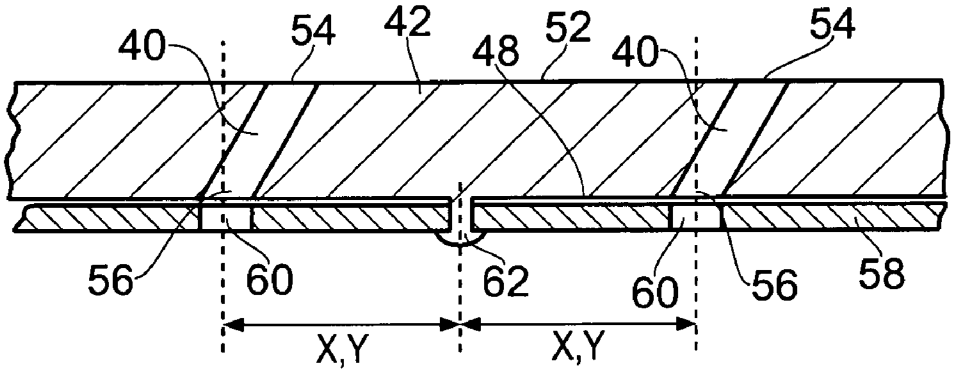
Figure 4B:
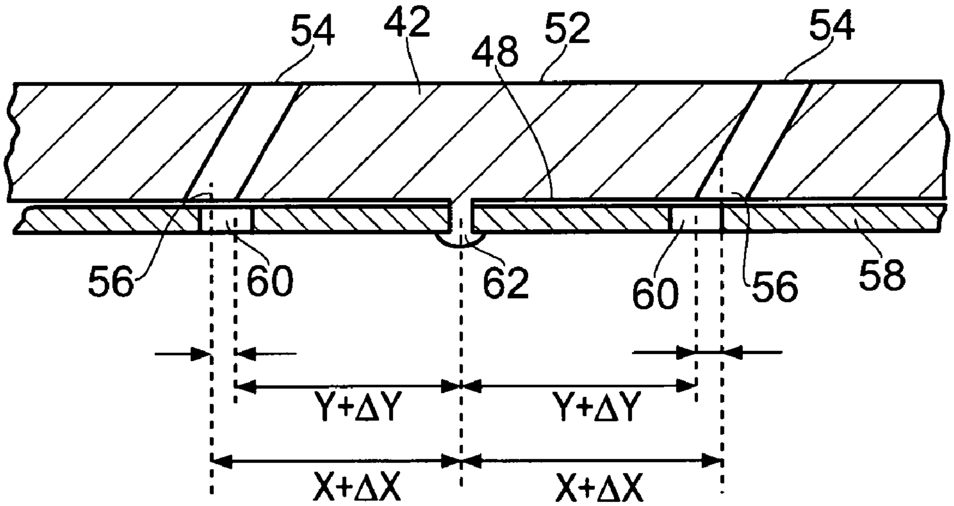

The invention and how it may be carried out in practice will now be described in more, detail with reference to the accompanying drawings, in which:

FIGS. 1 and 2 show cutaway views of alternative examples of gas turbine engine air-cooled turbine blades to which the invention may be applied;

FIGS. 3*a* and 3*b* show a first embodiment of an air flow modulation arrangement in accordance with the present invention, and FIGS. 4*a* and 4*b* show another embodiment of an airflow modulation arrangement in accordance with the invention.

FIG. 1 illustrates a first example of an air-cooled blade typical of a gas turbine engine air-cooled turbine blade. The turbine blade generally indicated at 2 comprises a hollow airfoil blade section 4 extending above a blade platform 6, which is cast integrally with a root section 8. Cooling air form a source (not shown), but which is normally derived from a bleed in the high compressor section of the gas turbine engine, enters the interior of the hollow blade section 4 through a supply inlet aperture 10 in the root front face 12 of the root section 8. The inlet aperture 10 communicates with internal passages generally indicated at 12 in the blade section 4, which may include leading edge, trailing edge and surface film cooling holes. If present, the inlet aperture also communicates with an under-platform cooling arrangement (not shown) and platform film cooling holes 14. In this example the aerofoil section 4 is also provided with leading edge film cooling holes 16, trailing edge film cooling holes 18 and tip cooling holes 20 all fed by cooling air exhausted from the internal multi-pass internal cooling system supplied through aperture 10.

The detailed arrangement of the internal blade cooling systems does not have immediate impact on the present invention, other than to illustrate that the systems can represent a significant demand for internal cooling air. The first consideration in the cooling air system design is to supply adequate cooling air at and near maximum power ratings. Unless the cooling air supply system includes some sort of control valve arrangement or variable restriction this means that the cooling airflow rate at lower power settings is principally determined by the compressor bleed pressure. For illustrative purposes only FIGS. 1 and 2 show turbine blades have internal multi-pass cooling passage arrangements, trailing edge and external surface film cooling supported by air exhausted through film effusion holes supplied from the internal air system.

FIG. 2 shows another design of turbine blade generally indicated at 22 also provided with a total loss, multi-pass internal cooling system in which the cooling air is exhausted through leading edge, trailing edge and tip cooling holes 24, 26 and 28 respectively. In this case the cooling air enters the turbine blade through an entry aperture 30 formed in the base of the root 32 of the blade.

With reference to the illustration of FIG. 1, cooling in the internal cooling passages 12 is achieved by convective heat transfer to the air fed through the root aperture 10 and exhausted through holes 16, 18 and at the tip 20, there are also cooling exit holes in the airfoil side walls. The efficiency of the heat transfer process is affected by the area of the cooling passage walls, the temperature differential, and the velocity of cooling air. Air exiting through the holes 16, 18, and 20 cool the blade internally through convection and externally by means of a boundary layer film of air.

Referring now to FIGS. 3*a* and 3*b*, the invention provides a method of modulating cooling airflow through the interaction of a pair of metering apertures. A first of these metering apertures 40 comprises a throat in a cooling passage extending through a wall 42 of a component. The second metering aperture 44 is formed in a member 46, which is mounted relative to the component wall 42 such that metering apertures 40, 44 at least partially overlap. FIG. 3*a* illustrates the relative positions of the metering apertures 40, 44 at a higher end of the component operating temperature range, and FIG. 3*b* illustrates the relative positions of the apertures 40, 44 at a relatively cooler part of the temperature range. For the purposes of understanding operation of the invention the component 42 may be regarded as a relatively fixed member, and the member 46 as a relatively movable member. In this example the component wall 42 has a substantially planar surface 48 on its interior side against which the member 46 is located in a sliding relationship. The member 46 is represented as a substantially flat plate of rectangular cross-section which is fixed along one edge, indicated by arrow 50, to the wall of the component 42. The plate 46 is mounted in face-to-face contact with the wall 48 but is secured to component 42 only along the edge 50. Thus, the plate 46 is free to slide along the face 48 of the wall under the influence of differential thermal expansion anchored along the edge 50. In effect the relatively movable member functions as a shutter or a partial shutter in the airflow pathway.

The metering aperture 44 is formed in the member 46 a distance "X" away from the fixed edge 50 at room temperature. If "$k_1$" is the coefficient of thermal expansion of the material of which the member 46 is constructed, and "ΔT" is the operating temperature range then the difference in distance "ΔX" over the operating temperature range of the metering aperture from the fixed edge 50 is given by the expression $$\Delta X = k_1 \cdot X \cdot \Delta T.$$

If "$k_2$" is the coefficient of thermal expansion of the material of which the component 42 is manufactured then the difference "ΔY" in the same "X" in the component 42 is given by the expression $$\Delta Y = k_2 \cdot Y \cdot \Delta T$$

$$\text{therefore } \Delta Y - \Delta X = X(k_2 - k_1) \cdot \Delta T.$$

Since the distance ΔY−ΔX is the distance of relative movement of the parts containing the metering apertures it is clear that to provide effective modulation of airflow through the pair of interactive metering apertures the difference "ΔY−ΔX" must be approximately the same dimension as the size of the metering aperture(s).

A general conclusion to be drawn from this analysis, therefore, is that the displacement of the relatively movable member is proportional to the distance between a metering aperture and an anchor point. Conversely, in a situation where the distance between a metering aperture and an anchor point is limited, then the displacement achievable will determine the size of the metering aperture that can be used to provide an effective level of variation. With this in mind the size and shape of a metering aperture can be chosen to make best use of the displacement provided over the operating temperature range.

Choice of materials is also an important consideration. In particular, the materials and/or the compositions of the materials of the component and the member are chosen to have different coefficients of thermal expansion. Normally it may be expected that the relatively movable member would be mounted in the interior of the component, in which case the material of the relatively fixed component would be unchanged and a material possessing a substantially different coefficient of thermal expansion would be selected for the material of the relatively movable member. In such cases the component would be manufactured using its usual material, for example a nickel alloy, and the relatively movable member would be made using another metal alloy of a substantially different thermal expansion coefficient or of a different material such as a carbon fibre reinforced composite material.

FIGS. 4*a* and 4*b*, in which like parts carry like references shows a detail view of a section through the external wall 42 of the airfoil section of the turbine blade (2 FIG. 1; 22 FIG. 2). The wall 42 has an internal surface 48 exposed to cooling air in an internal passage and an external surface 52 on which, in operation, a boundary layer or film of protective cooling air is formed by effusion of cooling air from a plurality of film cooling holes 54. These film cooling holes are the exit apertures of wall cooling passages 40 formed through the wall 42. In turn passages 40 emerge in the interior of the component at entry holes 56.

Incidentally in this example the passages 40 are inclined in a downstream direction in order that the plumes of cooling air emitted from exit holes 54 are at an oblique angle to the exterior surface into boundary layer 30 so as to more easily merge together to form an effective surface cooling film. Also the narrowest point of the passages 40, which constitutes the metering aperture may be located anywhere along the length of the passage.

As a means of controlling the flow of air through passageways 40 a modulation plate 58 is mounted against the interior wall 48. The plate 58 is pierced by a plurality of metering apertures 60 through which cooling air is admitted into the passages 40. Whereas in the previous example of FIGS. 3*a* and 3*b* one edge of plate 46 is trapped or anchored to the blade wall at 50, so that thermal growth is unidirectional, in this example the member or plate 58 is anchored at 62 to the relatively fixed component 42 at or towards a point or line mid-way between two metering apertures 54 spaced apart in the direction of thermal growth. As before the modulation plate 58 and the component walls 42 are constructed of material having different coefficients of thermal expansion. As a result of differential thermal expansion the plate 58 for any given temperature rise, or fall, will expand or contract a different amount compared to the blade wall 42 and the apertures 60 in plate 58 will function as shutters to at least partially obstruct airflow entry into entry apertures 56.

FIG. 4*a* shows the position of the modulation aperture 60 in plate 58 relative to the inlet aperture 56 of passageway 40 at maximum operating temperature, for example at maximum power at take-off and climb. At this temperature and in this position the apertures 60 and 56 are completely overlapped and the plate presents no practical impedance to cooling flow into passageway 40.

FIG. 4*b* shows the arrangement at a lower temperature in the operating range, for example at normal cruise power setting. As a result of the lower operating temperature the engine has reduced cooling requirements. Consequently the temperature of the blade or vane materials and therefore its cooling requirements, is substantially reduced and plate 58 is therefore subject to less thermal expansion. In this situation the apertures 60 in the plate 58 now only partially overlap the apertures 56 in the component wall and as a consequence the flow of cooling air into the passageway 40 is reduced.

The invention claimed is:

1. A method of modulating a cooling airflow through a film cooling effusion hole formed in a wall of a gas turbine engine airfoil to provide external surface film cooling of said wall including the steps of arranging the airflow to pass through a pair of metering apertures, the first of which is constituted by said film cooling effusion hole in said airfoil wall and the second of which is formed in a member mounted relative to said airfoil member wall so that said metering apertures at least partially overlap, the airfoil wall and the member being manufactured from materials having different coefficients of thermal expansion such that over a range of operating temperatures the metering apertures overlap to a greater or lesser extent to modulate the flow of air therethrough.

2. A method of modulating a cooling airflow as claimed in claim 1 wherein the coefficient of thermal expansion of the material of the airfoil wall is greater than the coefficient of thermal expansion of the material of the member mounted relative to said airfoil wall.

3. A gas turbine engine airfoil having a wall with a metering aperture therein to constitute a film cooling effusion hole for the flow of air therethrough to provide external surface film cooling of said wall, said airfoil additionally being provided with a member having a metering aperture therein which member is mounted relative to said airfoil member wall so that said metering apertures at least partially overlap, the airfoil wall and the member being manufactured from materials having different coefficients of thermal expansion so that over a range of operating temperatures, the metering apertures overlap to a greater or lesser extent to modulate the flow of air therethrough.

4. A gas turbine engine airfoil as claimed in claim 3 wherein the coefficient of thermal expansion of the material of the airfoil wall is greater than the coefficient of thermal expansion of the member mounted relative to said airfoil wall.

5. A gas turbine engine airfoil as claimed in claim 3 wherein the member is anchored relative to the airfoil wall at a position spaced apart from metering aperture in said member so that the overlap of the first and second metering apertures is determined by the amount of differential thermal expansion.

6. A gas turbine engine airfoil as claimed in claim 4 wherein the member is anchored relative to the airfoil wall at a position spaced apart from metering aperture in said member so that the overlap of the first and second metering apertures is determined by the amount of differential thermal expansion.

* * * * *